US006860012B2

(12) United States Patent
Lee

(10) Patent No.: US 6,860,012 B2
(45) Date of Patent: Mar. 1, 2005

(54) METHOD FOR FORMING ELASTIC VENTILATION CUSHION

(76) Inventor: Chien Tan Lee, 235 Chung-Ho Box 8-24, Taipei (TW)

( * ) Notice: Subject to any disclaimer, the term of this patent is extended or adjusted under 35 U.S.C. 154(b) by 41 days.

(21) Appl. No.: 10/361,179

(22) Filed: Feb. 10, 2003

(65) Prior Publication Data

US 2004/0154150 A1 Aug. 12, 2004

(51) Int. Cl.[7] .................................................. B23P 15/16

(52) U.S. Cl. ......................... 29/896.6; 29/91.1; 83/660; 83/695; 83/678

(58) Field of Search ............................... 29/896.6, 91.1, 29/561, 896.62; 83/660, 695, 678, 651.1; 225/29; 428/43, 134

(56) References Cited

U.S. PATENT DOCUMENTS

| | | | | | |
|---|---|---|---|---|---|
| 1,919,984 | A | * | 7/1933 | Murphy | 445/47 |
| 2,388,069 | A | * | 10/1945 | Meaker et al. | 219/384 |
| 2,754,581 | A | * | 7/1956 | Thomas | 72/186 |
| 3,097,124 | A | * | 7/1963 | Denenberg | 428/138 |
| 3,526,349 | A | * | 9/1970 | Moro | 225/97 |
| 3,645,830 | A | * | 2/1972 | Warp | 156/510 |
| 4,184,619 | A | * | 1/1980 | Stewart et al. | 225/94 |
| 4,326,909 | A | * | 4/1982 | Slavik | 156/253 |
| 4,454,891 | A | * | 6/1984 | Dreibelbis et al. | 137/216 |
| 5,066,531 | A | * | 11/1991 | Legg et al. | 428/131 |
| 5,151,077 | A | * | 9/1992 | Cole et al. | 493/353 |
| 5,313,863 | A | * | 5/1994 | Aihara et al. | 83/171 |
| 5,690,179 | A | * | 11/1997 | Dickson | 172/21 |

* cited by examiner

*Primary Examiner*—David P. Bryant
*Assistant Examiner*—Stephen Kenny

(57) ABSTRACT

A method for forming elastic ventilation cushion comprises the steps of arranging a plurality of needle seats at two banks, an upper bank and a lower bank, and a straight gap is formed between the upper bank and the lower bank, wherein one edge of each needle seat near the other bank is mounted with a plurality of slender needles, wherein each distal end of the needles is folded as a distal folded section; passing an elastic cushion through the gap; and moving the needle seats at the upper and lower banks so that the length of the gap is enlarged or reduced, thereby, the needles on the needle seats will pierce the elastic cushion and the distal folded section will tear surfaces of the elastic cushion to form a plurality of elastic ventilation slits on the elastic cushion. Moreover, the needle seats can be replaced by needle rollers.

2 Claims, 6 Drawing Sheets

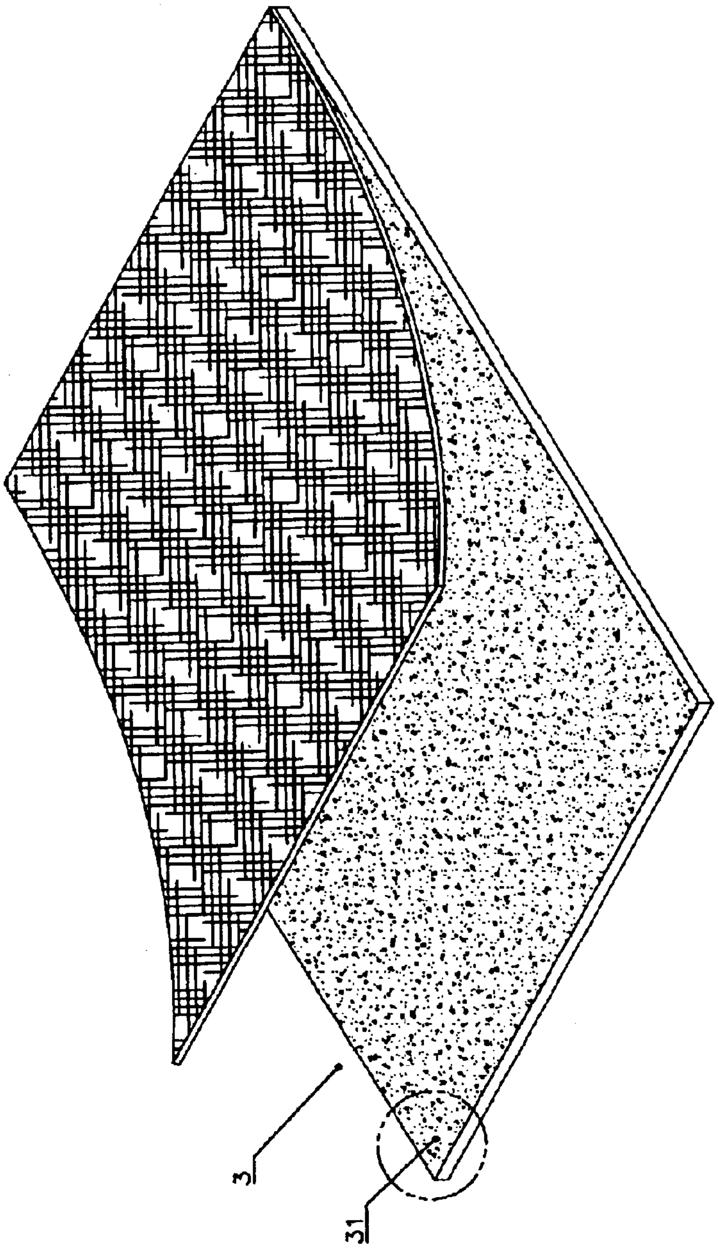
Fig.3
Prior Art
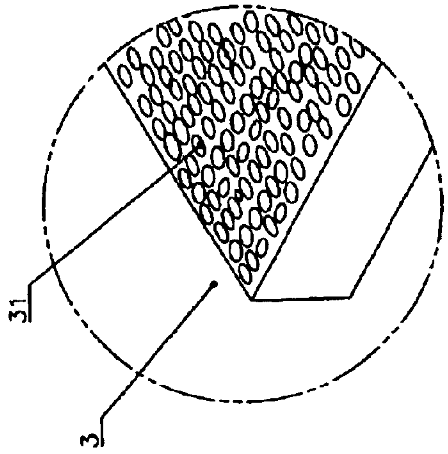
Fig.3-A
Prior Art

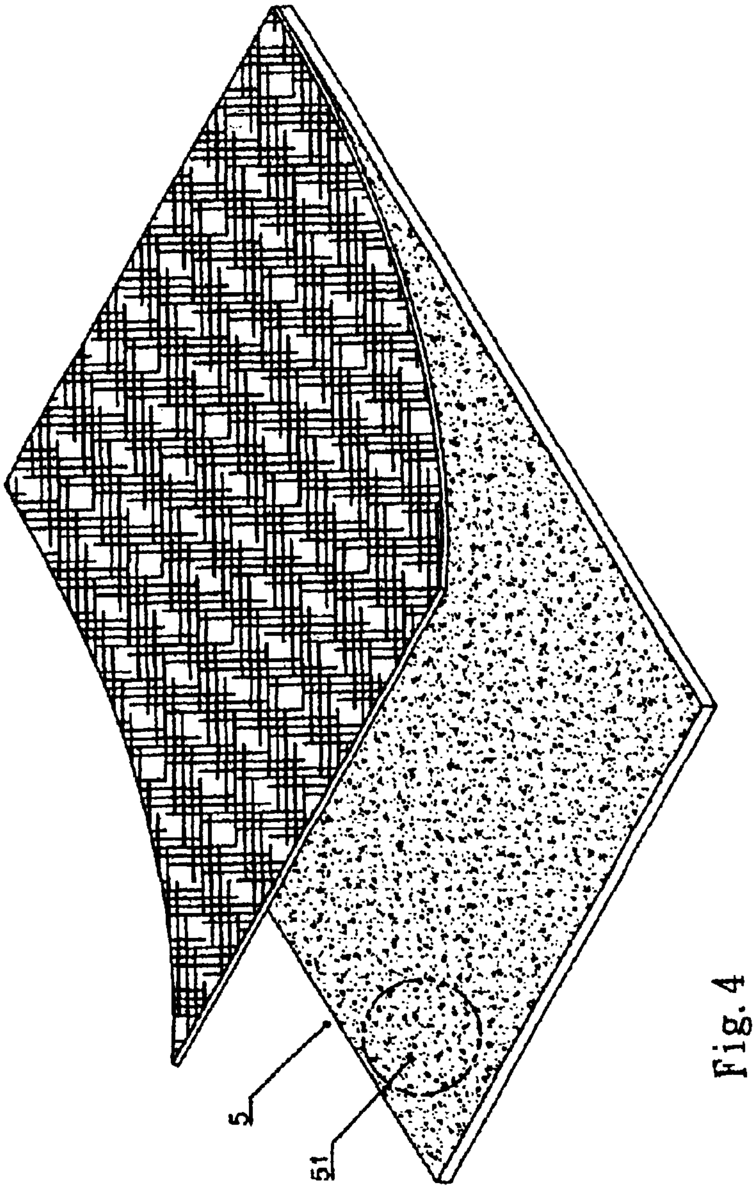
Fig. 4
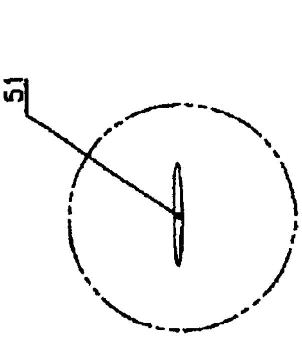
Fig. 4-A
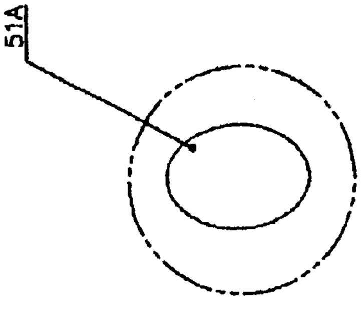
Fig. 4-B

Fig. 5-A

METHOD FOR FORMING ELASTIC VENTILATION CUSHION

FIELD OF THE INVENTION

The present invention relates to cushions, and particularly to a method for forming elastic ventilation cushion which forms ventilation slits on the elastic ventilation cushion.

BACKGROUND OF THE INVENTION

Referring to FIG. 1, a prior art elastic cushion 5 is illustrated. The method for forming ventilation holes 21 on an elastic cushion 2 is illustrated. The elastic cushion 2 in the prior art is punched by a plurality of pins continuously so as to formed a plurality of holes which may have smaller sizes (referring to FIG. 1) or larger sizes (referring to FIG. 2). In this prior art, under considering the problem of removing the waste from punching the holes, the size of the holes can not be reduced to a desired value and the density of holes is low.

Although the prior art cushion 2 drains out some wastes so that the elastic cushion 2 is light, the ventilation holes 21 are distributed on the cushion selectively on some part. Thus, the ventilation is bad at some parts lack of ventilation holes. Moreover, the holes will cause that the support of the elastic cushion 2 is not good so that the surface of the elastic cushion 2 will not smooth as being used for a long time.

To solve above mentioned defect in the prior art, in another design, as shown in FIGS. 3 and 3A, corrosive is coated on the surface of an elastic cushion 3 so that the surface is corroded and thus the surface will form a plurality of ventilation holes 31. Although the elastic cushion 3 may vent air in wholly surface, in this prior art, the ventilation holes are distributed statistically and thus not uniform. Moreover, some corrosive agents will leave on the surface of the elastic cushion 3 so that the specific gravity of the elastic cushion 3 will increase.

Moreover, this prior art way is too high. Thereby, the ventilation holes 31 will cause that the surface of the elastic cushion 3 is not flat so that the gluing or adhering operations on the surface of the elastic cushion 3 is not strong and therefore, the strength of the structure is not preferred.

SUMMARY OF THE INVENTION

Accordingly, the primary object of the present invention is to provide a method for forming elastic ventilation cushion comprising the steps of arranging a plurality of needle seats at two banks, an upper bank and a lower bank, and a straight gap is formed between the upper bank and the lower bank, wherein one edge of each needle seat near the other bank is mounted with a plurality of slender needles, wherein each distal end of the needles is folded as a distal folded section; passing an elastic cushion through the straight gap between the upper bank and the lower bank; and moving the needle seats at the upper and lower banks so that the gap is enlarged or reduced, thereby, the needles on the needle seats will pierce the elastic cushion and the distal folded section will tear surfaces of the elastic cushion to form a plurality of elastic ventilation slits on the elastic cushion.

Another object of the present invention is to provide a method for forming elastic ventilation cushion comprising the steps of: arranging a plurality of needle rollers at two banks, an upper bank and a lower bank, wherein a gap is formed between the upper bank and the lower bank; a round periphery of each needle seat is mounted with a plurality of slender needles, wherein each distal end of the needles is folded as a distal folded section; and passing an elastic cushion through the gap between the upper bank and the lower bank; moving the needle rollers at the upper and lower banks so that the needles on the needle rollers will pierce the elastic cushion and the distal folded section will tear surfaces of the elastic cushion to form a plurality of ventilation slits on the elastic cushion.

The various objects and advantages of the present invention will be more readily understood from the following detailed description when read in conjunction with the appended drawing.

BRIEF DESCRIPTION OF THE DRAWINGS

FIG. 3 is a schematic view showing another structure for describing the prior art ventilation elastic cushion.

FIG. 3A is a partial enlarged view of FIG. 3.

FIG. 4 shows a schematic view for describing the present invention.

FIGS. 4A and 4B is a schematic view showing the ventilation slits of the present invention.

FIG. 5A shows the needle seat of the present invention and a partial enlarged view of the needle seat.

BRIEF DESCRIPTION OF THE PREFERRED EMBODIMENTS

Figure 1:
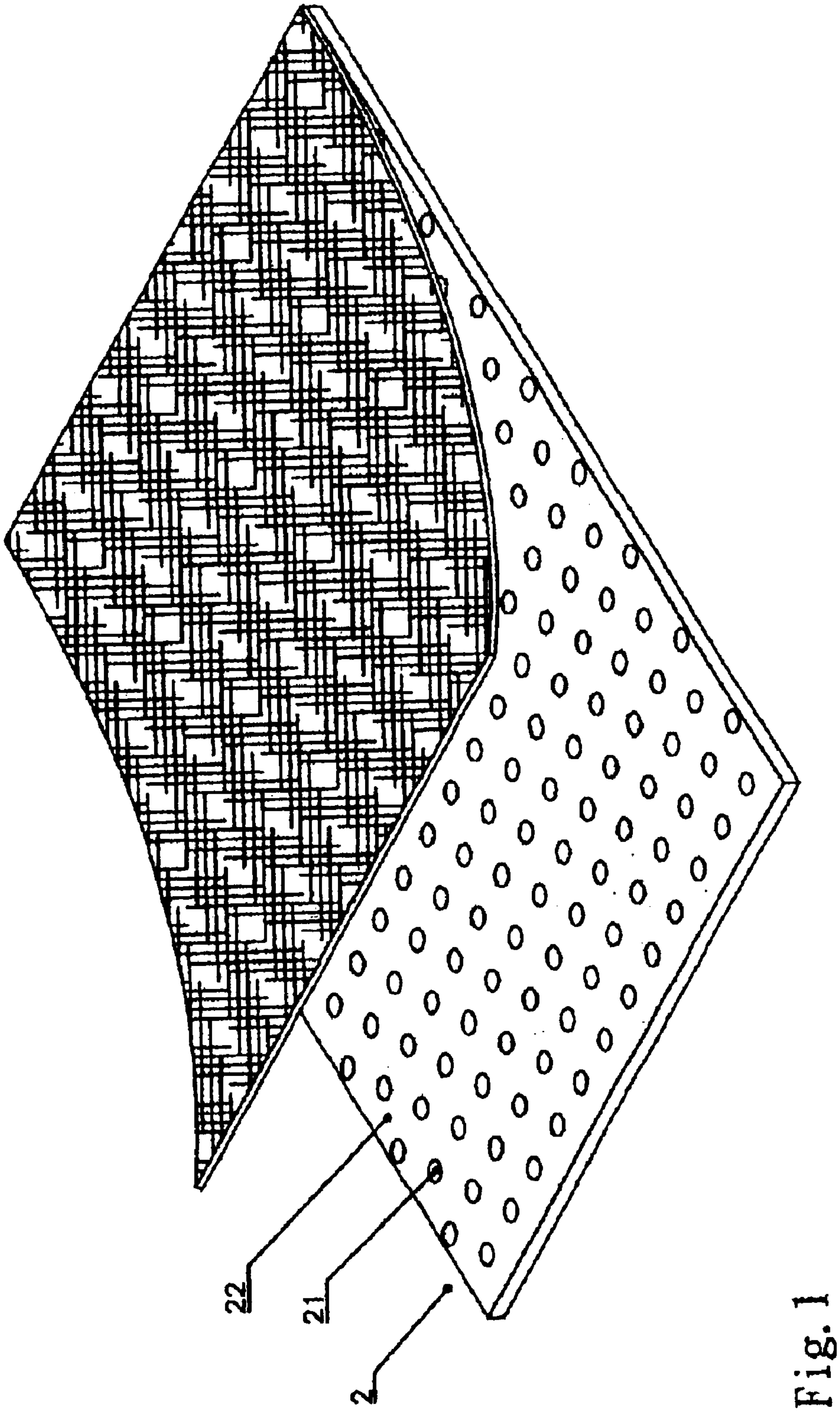
Fig.1 Prior Art
FIG. 1 is a schematic view showing a structure for describing the prior art ventilation elastic cushion.
Figure 2:
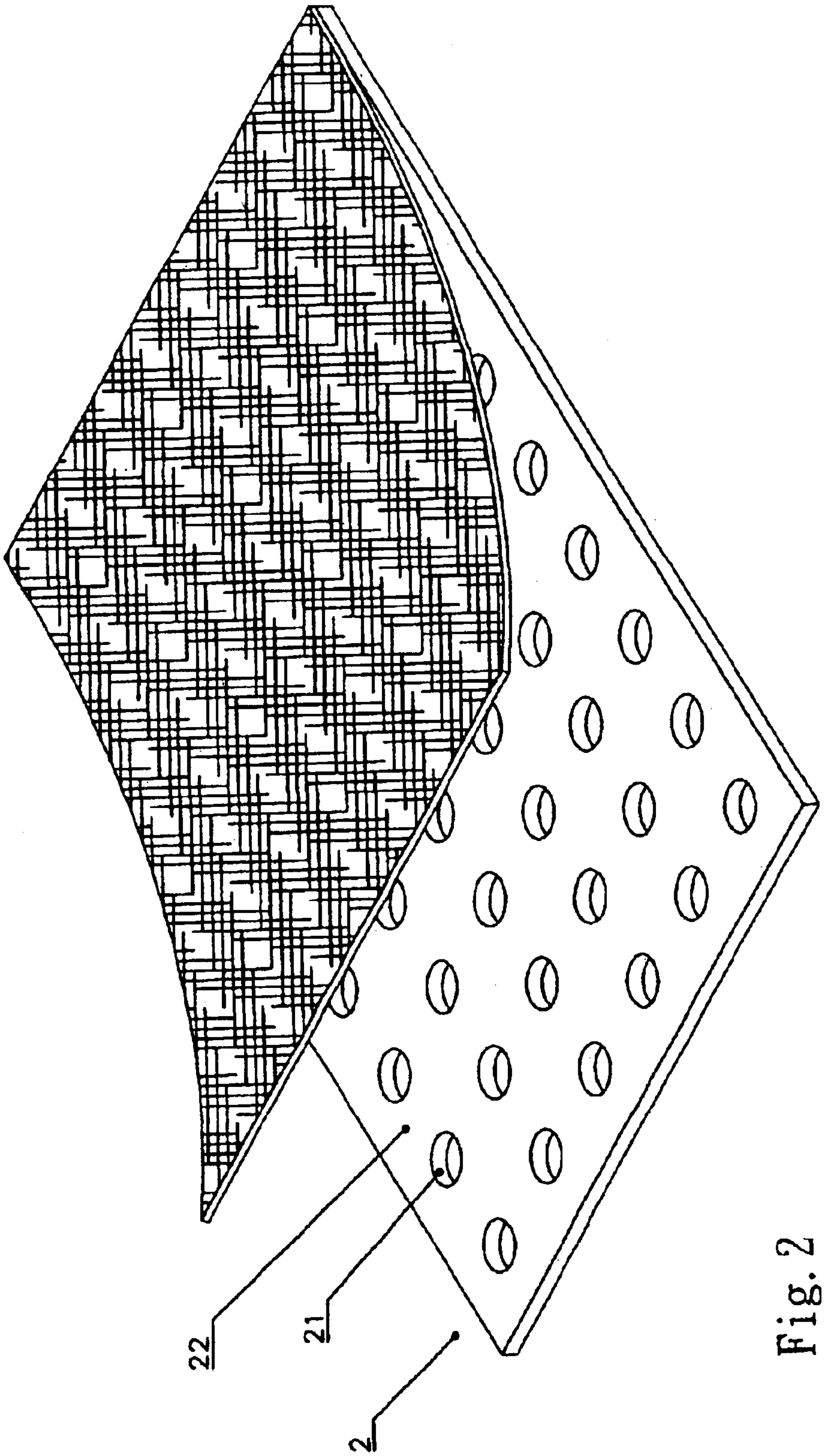
Fig. 2 Prior Art
FIG. 2 is a schematic view showing a further structure for describing the prior art ventilation elastic cushion.
Figure 5:
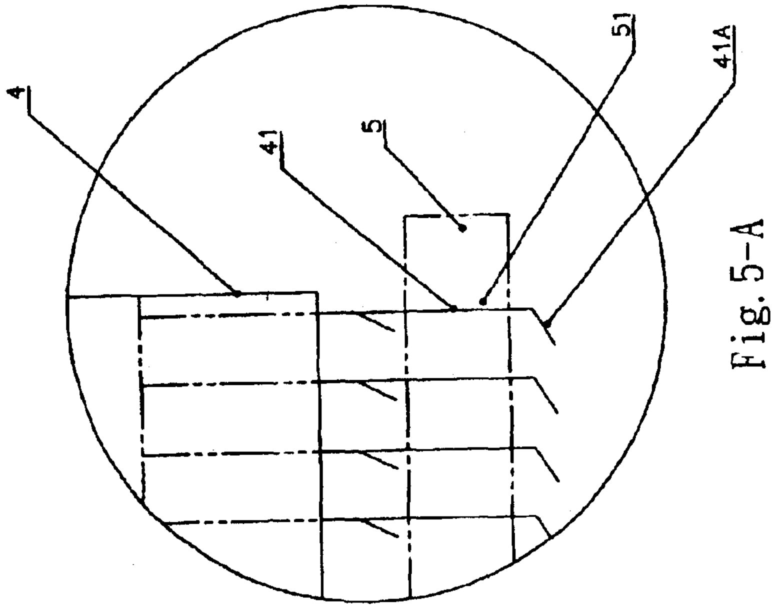
FIG. 5 shows the method for manufacturing the ventilation elastic cushion of the present invention.
Figure 5:
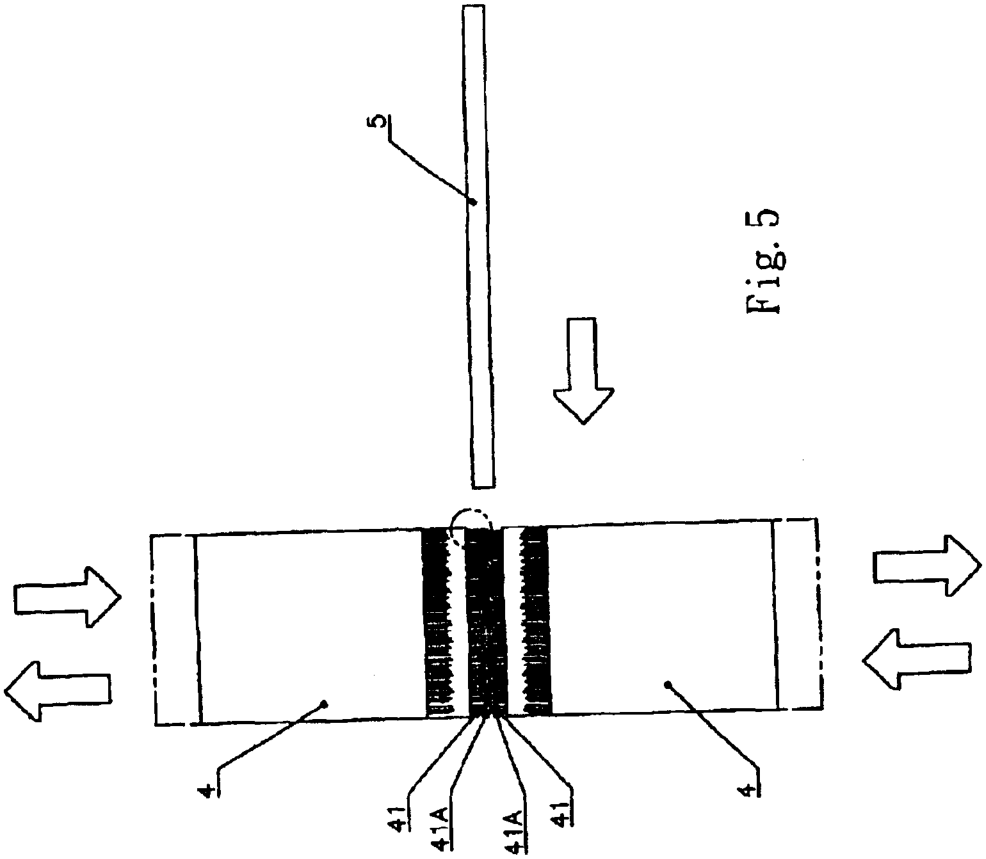
Figure 6:
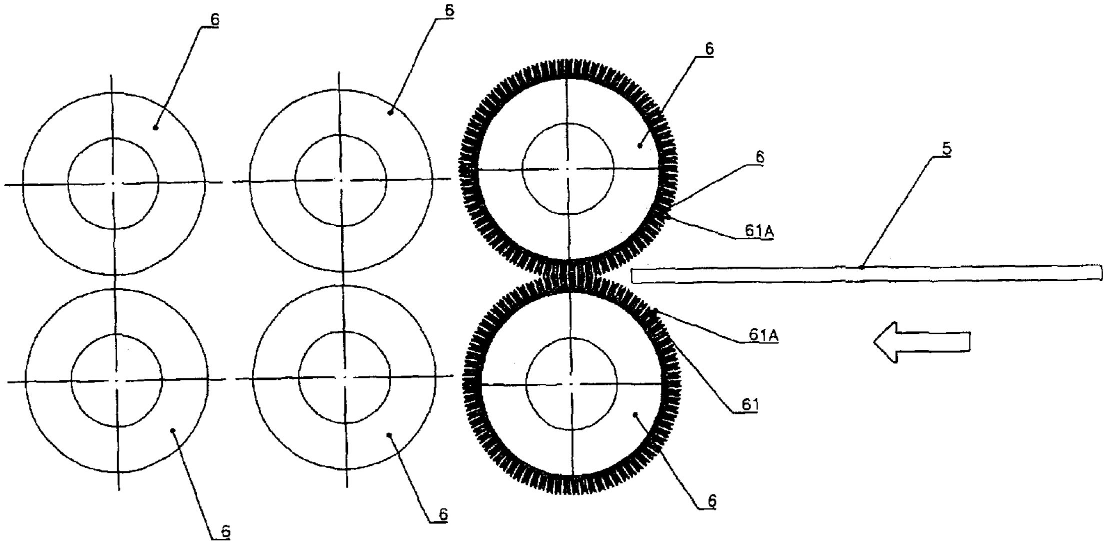
FIG. 6 shows another embodiment of the present invention for manufacturing the ventilation elastic cushion of the present invention.

Referring to FIGS. 4 and 5, a method for forming elastic ventilation cushion is illustrated. The present invention comprises the steps of arranging a plurality of needle seats 4 at two banks, an upper bank and a lower bank, and a straight gap is formed between the upper bank and the lower bank, wherein one edge of each needle seat 4 near the other bank is mounted with a plurality of slender needles, wherein each distal end of the needles 41 is folded as a distal folded section 41A, as shown in FIG. 5A; passing an elastic cushion through the straight gap between the upper bank and the lower bank; moving the needle seats 4 at the upper and lower banks so that the gap is enlarged or reduced, thereby, the needles on the needle seats 4 will pierce the elastic cushion 5 and the distal folded section 41A will tear surfaces of the elastic cushion 5 to form a plurality of ventilation slits 51 on the elastic cushion 5, as shown in FIG. 4B. Therefore, normally, the elastic cushion 5 is closed, as shown in FIG. 4A.

In above steps, the movement of the needle seats 4 is vertical to the orientation of the gap. Another embodiment of the present invention is illustrated, where the needle seat 4 in above embodiment is replaced by the needle roller 6. In this embodiment, the present invention comprises the steps of arranging a plurality of needle rollers 6 at two banks, an upper bank and a lower bank, and a gap is formed between the upper bank and the lower bank, wherein a round periphery of each needle seat 6 is mounted with a plurality of slender needles, and each distal end of the needles 61 is folded as a distal folded section 61A; passing an elastic cushion through the gap between the upper bank and the lower bank; moving the needle rollers 6 at the upper and lower banks so that the needles 61 on the needle rollers 6 will pierce the elastic cushion 5 and the distal folded section 61A will tear surfaces of the elastic cushion 5 to form a plurality of ventilation slits 51 on the elastic cushion 5.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for forming elastic ventilation cushion comprising the steps of:

arranging a plurality of needle seats which are arranged as two banks; an upper bank and a lower bank, and a straight gap is formed between the upper bank and the lower bank, wherein one edge of each needle seat near the other bank is mounted with a plurality of slender needles, and each distal end of each needle is folded as a distal folded section;

passing an elastic cushion through the straight gap between the upper bank and the lower bank;

moving the needle seats of the upper and lower banks so that a length of the gap is enlarged or reduced, thereby, the needles on the needle seats will pierce the elastic cushion and the distal folded section will tear surfaces of the elastic cushion to form a plurality of elastic ventilation slits on the elastic cushion.

2. A method for forming elastic ventilation cushion comprising the steps of:

arranging a plurality of needle rollers at two banks, an upper bank and a lower bank, wherein a gap is formed between the upper bank and the lower bank; a round periphery of each needle seat is mounted with a plurality of slender needles, wherein each distal end of the needles is folded as a distal folded section; and passing an elastic cushion through the gap between the upper bank and the lower bank;

moving the needle rollers at the upper and lower banks so that the needles on the needle rollers will pierce the elastic cushion and the distal folded section will tear surfaces of the elastic cushion to form a plurality of ventilation slits on the elastic cushion.

* * * * *